US011762973B2

(12) United States Patent
Arunkumar et al.

(10) Patent No.: US 11,762,973 B2
(45) Date of Patent: Sep. 19, 2023

(54) AUDITING OF MULTI-FACTOR AUTHENTICATION

(71) Applicant: International Business Machines Corporation, Armonk, NY (US)

(72) Inventors: Saritha Arunkumar, Basingstoke (GB); Cheng-Ta Lee, Chamblee, GA (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 17/455,027

(22) Filed: Nov. 16, 2021

(65) Prior Publication Data

US 2023/0153417 A1    May 18, 2023

(51) Int. Cl.
G06F 21/40    (2013.01)

(52) U.S. Cl.
CPC .................... *G06F 21/40* (2013.01)

(58) Field of Classification Search
CPC ..................................... G06F 21/40
USPC .............................................. 726/7
See application file for complete search history.

(56) References Cited

U.S. PATENT DOCUMENTS

| | | | |
|---|---|---|---|
| 7,647,628 B2 | 1/2010 | Kebinger | |
| 8,806,205 B2 | 8/2014 | Metke | |
| 9,055,029 B2 | 6/2015 | Narendra | |
| 9,118,656 B2 | 8/2015 | Ting | |
| 10,057,227 B1 | 8/2018 | Hess | |
| 10,341,310 B1 | 7/2019 | Leon | |
| 2003/0172272 A1* | 9/2003 | Ehlers | G06Q 20/425 713/170 |
| 2015/0089635 A1 | 3/2015 | Alpert | |
| 2017/0111340 A1* | 4/2017 | Gomi | H04L 63/08 |
| 2018/0196960 A1 | 7/2018 | Gullicksen | |
| 2019/0042723 A1 | 2/2019 | Cockcroft | |
| 2019/0132131 A1* | 5/2019 | Clements | H04L 9/3239 |
| 2019/0268321 A1* | 8/2019 | Kim | G06F 21/31 |
| 2019/0303553 A1* | 10/2019 | Choiniere | G06F 21/32 |

(Continued)

FOREIGN PATENT DOCUMENTS

| | | |
|---|---|---|
| CN | 113641981 A | 11/2021 |
| EP | 3518190 A1 | 7/2019 |
| WO | 2017001972 A1 | 1/2017 |

OTHER PUBLICATIONS

"Patent Cooperation Treaty PCT International Search Report", Applicant's File Reference, International Application No. PCT/IB2022/059940, International Filing Date: Oct. 17, 2022, dated Jan. 12, 2023, 9 pages.

(Continued)

*Primary Examiner* — Michael S McNally
(74) *Attorney, Agent, or Firm* — Michael O'Keefe

(57) ABSTRACT

In an approach to auditing of multi-factor authentication, one or more computer processors receive a request for a multi-factor authentication for a service from at least one device associated with a user. One or more computer processors retrieve information associated with the at least one device. One or more computer processors log the request and the information associated with the at least one device. One or more computer processors calculate a strength of the multi-factor authentication based on the request and the information associated with the at least one device. One or more computer processors log a multi-factor authentication audit trail.

17 Claims, 4 Drawing Sheets

(56) References Cited

U.S. PATENT DOCUMENTS

2020/0014702 A1    1/2020  Dasgupta
2021/0035116 A1*   2/2021  Berrington ................ G06F 9/54

OTHER PUBLICATIONS

Brand et al., "Web Authentication: An API for accessing Public Key Credentials Level 1", W3C Recommendation, Mar. 4, 2019, 165 Pages.
Google, "Login audit log", Google Workspace Admin, Accessed on Sep. 14, 2021, 3 Pages.
NIST, "Back to basics: Multi-factor authentication (MFA)", NIST: National Institute of Standards and Technology, U.S. Department of Commerce, Information Technology Laboratory / Applied Cybersecurity Division, Apr. 19, 2021, 4 Pages.

* cited by examiner

US 11,762,973 B2

AUDITING OF MULTI-FACTOR AUTHENTICATION

BACKGROUND OF THE INVENTION

The present invention relates generally to the field of multi-factor authentication, and more particularly to auditing of multi-factor authentication.

Electronic authentication is the process of establishing confidence in user identities electronically presented to an information system. Digital authentication or e-authentication may be used synonymously when referring to the authentication process that confirms or certifies a person's identity. When used in conjunction with an electronic signature, electronic authentication can provide evidence of whether data received has been tampered with after being signed by its original sender. Electronic authentication can reduce the risk of fraud and identity theft by verifying that a person is who they say they are when performing transactions online or in person in a retail store.

Multi-factor authentication is an authentication method in which a computer user is granted access only after successfully presenting two or more pieces of evidence (or factors) to an authentication mechanism, where the factors can include knowledge (something the user and only the user knows), possession (something the user and only the user has), and inherence (something the user and only the user is).

SUMMARY

Embodiments of the present invention disclose a computer-implemented method, a computer program product, and a system for auditing of multi-factor authentication. The computer-implemented method may include one or more computer processors receiving a request for a multi-factor authentication for a service from at least one device associated with a user. One or more computer processors retrieve information associated with the at least one device. One or more computer processors log the request and the information associated with the at least one device. One or more computer processors calculate a strength of the multi-factor authentication based on the request and the information associated with the at least one device. One or more computer processors log a multi-factor authentication audit trail.

DETAILED DESCRIPTION

Multi-factor authentication is necessary when a single user credential cannot guarantee security. For example, a banking website may require a user to input a one-time password after the user inputs a correct user credential to log in to the website. In addition, existing open authentication solutions recommend the usage of a second factor of authentication. When a multi-factor authentication is performed on the same device, it essentially becomes a single factor authentication. For example, if a user's banking application and one-time password generator are on the same smart phone, and the phone is stolen, the thief can perform a two-factor authentication on the same device to gain access to the user's data and/or information.

Embodiments of the present invention recognize that data security can be improved by providing a system that can audit the security level in a multi-factor authentication. Embodiments of the present invention also recognize that data security can be improved by providing a system that calculates the strength of a multi-factor authentication and adds the calculated strength to the audit trail. Implementation of embodiments of the invention may take a variety of forms, and exemplary implementation details are discussed subsequently with reference to the Figures.

Figure 1:
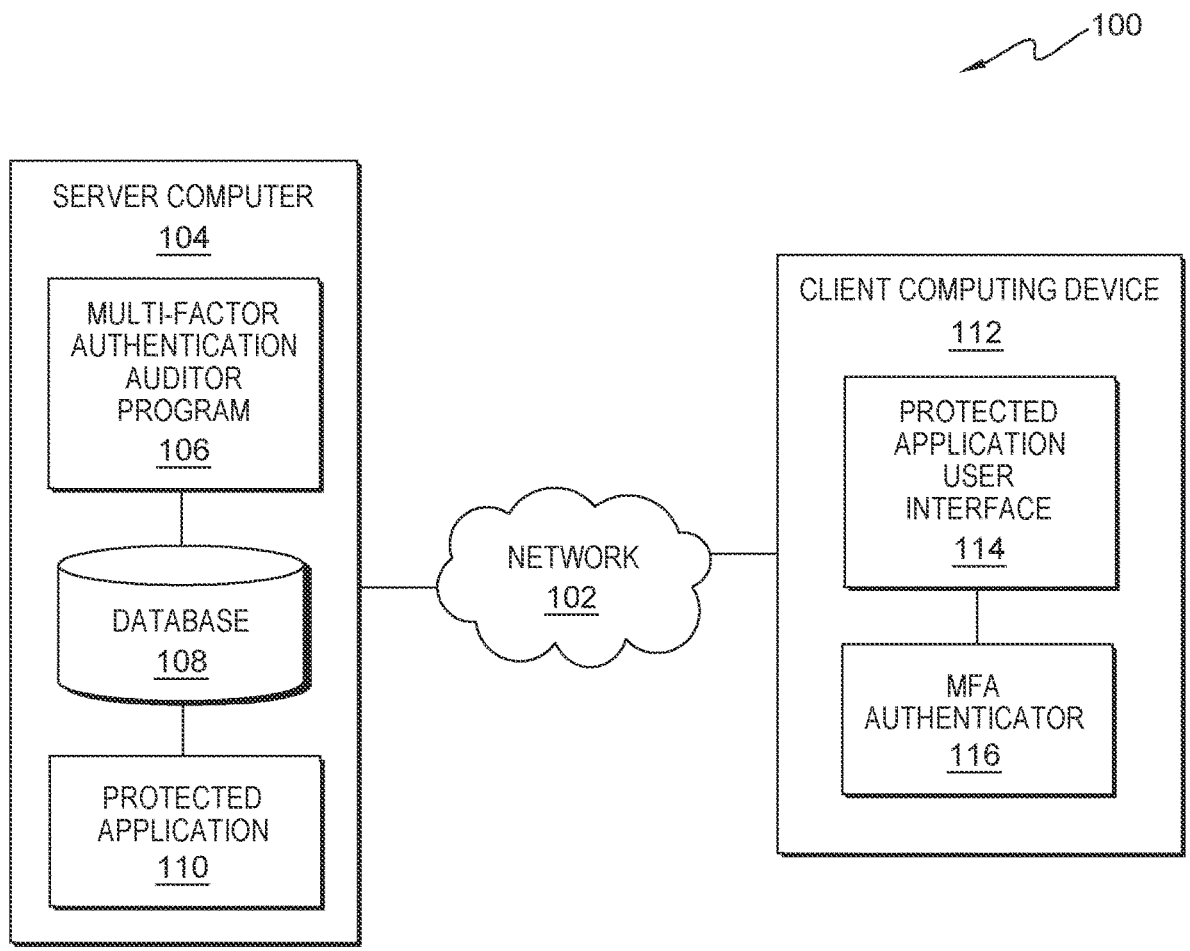
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes multi-factor authentication auditor program 106, database 108, and protected application 110. Server computer 104 may include internal and external hardware components, as depicted and described in further detail with respect to FIG. 4.

Multi-factor authentication auditor program 106 determines the strength of a multi-factor authentication based on device identification information. Once a user has registered with protected application 110 and provided device information as part of the registration process, multi-factor authentication auditor program 106 receives a multi-factor authentication request. Multi-factor authentication auditor program 106 determines whether the request includes the device information. If the request includes the device information, then multi-factor authentication auditor program 106 retrieves the device information. If the request does not include the device information, then multi-factor authentication auditor program 106 maps the request to the device information. Multi-factor authentication auditor program 106 logs the request and the device information. Multi-factor authentication auditor program 106 calculates the strength of the multi-factor authentication. If multi-factor authentication auditor program 106 detects an anomaly, then multi-factor authentication auditor program 106 determines whether a security policy is applicable and, if so, applies the security policy. Multi-factor authentication auditor program 106 transmits a notification. Multi-factor authentication auditor program 106 logs the multi-factor authentication audit trail. Multi-factor authentication auditor program 106 is depicted and described in further detail with respect to FIG. 2 and FIG. 3.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of logging a multi-factor authentication audit trail. These embodiments may also include periodic reminders of such recording and monitoring throughout the course of any such use. Certain embodiments may also include regular (e.g., daily, weekly, monthly) reminders to the participating parties that they have consented to being recorded and monitored for logging a multi-factor authentication audit trail and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

Database 108 stores information used and generated by multi-factor authentication auditor program 106 and protected application 110. In the depicted embodiment, database 108 resides on server computer 104. In another embodiment, database 108 may reside elsewhere within distributed data processing environment 100, provided that multi-factor authentication auditor program 106 and/or protected application 110 have access to database 108. A database is an organized collection of data. Database 108 can be implemented with any type of storage device capable of storing data and configuration files that can be accessed and utilized by multi-factor authentication auditor program 106, such as a database server, a hard disk drive, or a flash memory. Database 108 stores information associated with client computing device 112 such that multi-factor authentication auditor program 106 can recognize the identity of the device, including one or more seeds associated with authenticators that reside on client computing device 112. Database 108 also stores user registration request information. In addition, database 108 stores one or more security policies associated with protected application 110. Further, database 108 stores each authentication request received by multi-factor authentication auditor program 106 in association with a multi-factor authentication audit trail for each authentication request.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Multi-factor authentication auditor program 106 enables the authorized and secure processing of personal data. Multi-factor authentication auditor program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Multi-factor authentication auditor program 106 provides information regarding personal data and the nature (e.g., type, scope, purpose, duration, etc.) of the processing. Multi-factor authentication auditor program 106 provides the user with copies of stored personal data. Multi-factor authentication auditor program 106 allows the correction or completion of incorrect or incomplete personal data. Multi-factor authentication auditor program 106 allows the immediate deletion of personal data.

Protected application 110 is one of a plurality of software applications that require a user to perform a multi-factor authentication in order to gain authorized access to the function and/or data associated with protected application 110. For example, protected application 110 may be a banking application.

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display. The head mounted display may take the form-factor of a pair of glasses, such as augmented reality (AR) glasses. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of protected application user interface 114 and multi-factor authentication (MFA) authenticator 116.

Protected application user interface 114 provides an interface between protected application 110 on server computer 104 and a user of client computing device 112. In one embodiment, protected application user interface 114 is mobile application software. Mobile application software, or an "app," is a computer program designed to run on smart phones, tablet computers and other mobile devices. In one embodiment, protected application user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Protected application user interface 114 enables a user of client computing device 112 to interact with protected application 110. Protected application user interface 114 also enables a user of client computing device 112 to register one or more devices with protected application 110.

MFA authenticator 116 enables a user of client computing device 112 to perform a multi-factor authentication with protected application 110. A software-based authenticator (sometimes called a software token) may be implemented on a general-purpose electronic device such as a laptop, a tablet computer, or a smartphone. For example, a software-based authenticator implemented as a mobile app on the user's smartphone is a type of phone-based authenticator. In another embodiment, MFA authenticator 116 may be a physical one-time password generator (not shown) that resides elsewhere in distributed data processing environment 100. For example, MFA authenticator 116 may be a key-chain-size device that shows a one-time password on a small LED screen.

Figure 2:
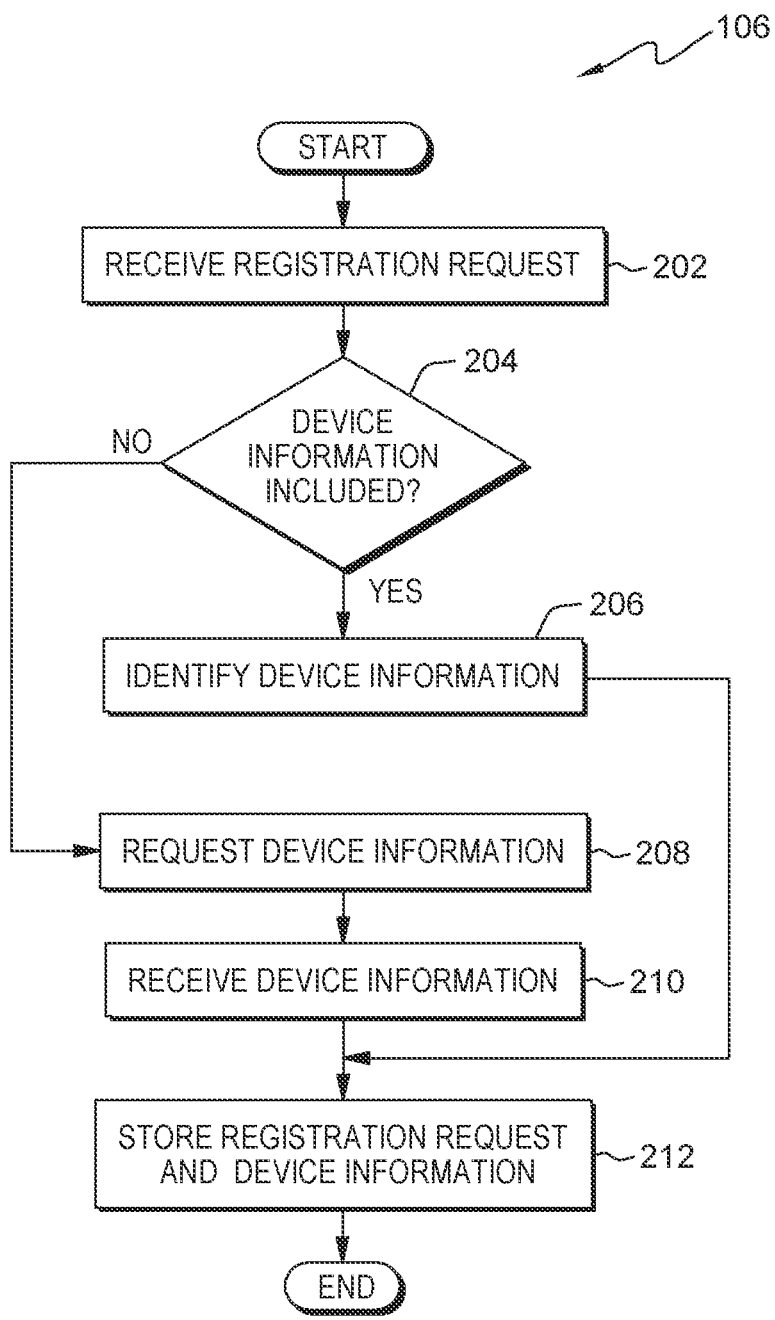
FIG. 2 is a flowchart depicting operational steps of a multi-factor authentication auditor program, on a server computer within the distributed data processing environment of FIG. 1, for gathering device information to be used in multi-factor identification, in accordance with an embodiment of the present invention.

FIG. 2 is a flowchart depicting operational steps of multi-factor authentication auditor program 106, on server computer 104 within distributed data processing environment 100 of FIG. 1, for gathering device information to be used in multi-factor identification, in accordance with an embodiment of the present invention.

Multi-factor authentication auditor program 106 receives a registration request (step 202). In an embodiment, the user of client computing device 112 requests to register with an application, such as protected application 110, via protected application user interface 114. In an embodiment, when protected application 110 receives the registration request, protected application 110 pushes the request to multi-factor authentication auditor program 106 and multi-factor authentication auditor program 106 receives the request. In another embodiment, when protected application 110 receives the registration request, protected application 110 stores the request in database 108, and multi-factor authentication auditor program 106 retrieves the registration request from database 108.

Multi-factor authentication auditor program 106 determines whether device information is included in the request (decision block 204). Multi-factor authentication auditor program 106 uses device information used in each step of a multi-factor authentication to calculate the strength of a multi-factor authentication. In an embodiment, multi-factor authentication auditor program 106 determines whether information associated with the device from which the registration request came, i.e., client computing device 112, is included in the request. Device information includes, but is not limited to, the type of device, the serial number, the operating system, the username, the IP address, the location, etc. In an embodiment, multi-factor authentication auditor program 106 determines whether protected application 110 attached metadata describing the device information with the request.

If multi-factor authentication auditor program 106 determines device information is included in the request ("yes" branch, decision block 204), then multi-factor authentication auditor program 106 identifies device information (step 206). In an embodiment, if the device information metadata is included in the request, then multi-factor authentication auditor program 106 identifies the device information from the metadata. For example, multi-factor authentication auditor program 106 identifies the serial number of the device.

If multi-factor authentication auditor program 106 determines device information is not included in the request ("no" branch, decision block 204), then multi-factor authentication auditor program 106 requests device information (step 208). In an embodiment, multi-factor authentication auditor program 106 requests protected application 110 to provide the device information. In another embodiment, multi-factor authentication auditor program 106 extracts the device information from protected application 110. In an embodiment where the user of client computing device 112 uses biometric authentication with a web application, multi-factor authentication auditor program 106 retrieves device information to map a public-key to the device information and generate a key-pair at registration. In another embodiment, when the user of client computing device 112 registers MFA authenticator 116, multi-factor authentication auditor program 106 associates the device information with the seed used in MFA authenticator 116, such that when the user inputs a one-time password, multi-factor authentication auditor program 106 recognizes which device generated the one-time password.

Multi-factor authentication auditor program 106 receives device information (step 210). In an embodiment, multi-factor authentication auditor program 106 receives the device information based on the method by which multi-factor authentication auditor program 106 requests the device information. For example, if multi-factor authentication auditor program 106 requests protected application 110 to provide the device information, then multi-factor authentication auditor program 106 receives the device information from protected application 110.

Responsive to identifying device information or receiving device information, multi-factor authentication auditor program 106 stores the registration request and associated device information (step 212). In an embodiment, multi-factor authentication auditor program 106 stores the registration request in association with the device information in database 108.

Figure 3:
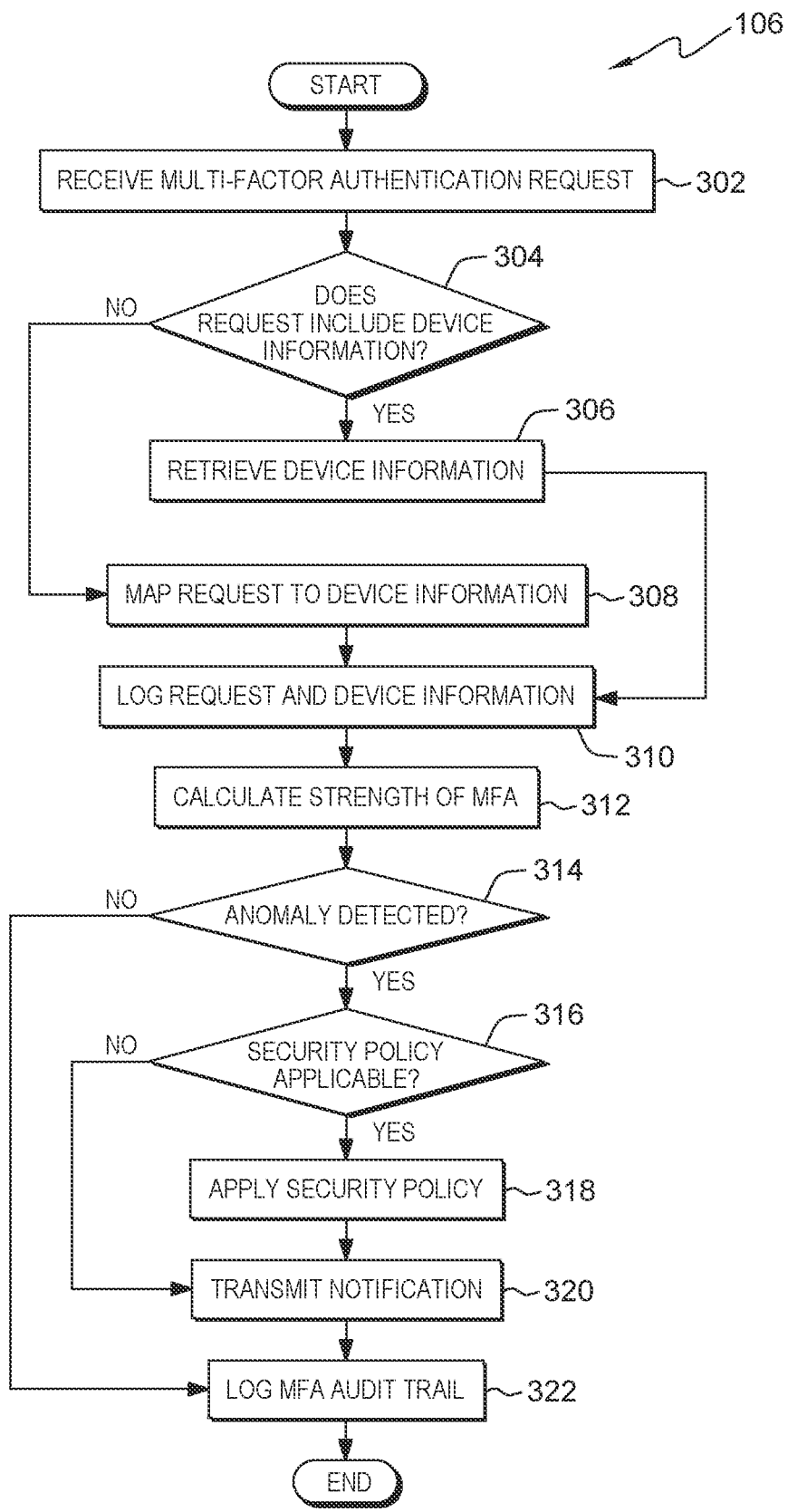
FIG. 3 is a flowchart depicting operational steps of the multi-factor authentication auditor program, on the server computer within the distributed data processing environment of FIG. 1, for determining a multi-factor authentication audit trail, in accordance with an embodiment of the present invention.

FIG. 3 is a flowchart depicting operational steps of multi-factor authentication auditor program 106, on server computer 104 within distributed data processing environment 100 of FIG. 1, for determining a multi-factor authentication audit trail, in accordance with an embodiment of the present invention.

Multi-factor authentication auditor program 106 receives a multi-factor authentication request (step 302). In an embodiment, multi-factor authentication auditor program 106 receives a request for multi-factor authentication when a user of client computing device 112 inputs a credential and/or biometric authentication in protected application 110, via protected application user interface 114, or from another device associated with the user (not shown), and protected application 110 pushes the request to multi-factor authentication auditor program 106. In an embodiment, multi-factor authentication auditor program 106 receives a request for multi-factor authentication when protected application 110 stores the request in database 108.

Multi-factor authentication auditor program 106 determines whether the request includes device information (decision block 304). In an embodiment, multi-factor authentication auditor program 106 determines whether protected application 110 attached metadata describing client computing device 112 with the request for a multi-factor authentication.

If multi-factor authentication auditor program 106 determines the request includes device information ("yes" branch, decision block 304), then multi-factor authentication auditor program 106 retrieves the device information (step 306). In an embodiment where protected application 110 attaches device metadata to multi-factor authentication auditor program 106 with the request for a multi-factor authentication, multi-factor authentication auditor program 106 retrieves the device information from the attachment. In an embodiment where the device information is stored in database 108, either by protected application 110 upon receipt of the request or during the registration phase, as described with respect to FIG. 2, multi-factor authentication auditor program 106 retrieves the device information from database 108.

If multi-factor authentication auditor program 106 determines the request does not include device information ("no" branch, decision block 304), then multi-factor authentication auditor program 106 maps the request to device information (step 308). In an embodiment, multi-factor authentication auditor program 106 performs an additional data correlation to map the request to the device information. For example, if the authentication request includes a one-time password, then multi-factor authentication auditor program 106 retrieves the seeds corresponding to each device associated with the user, such as from MFA authenticator 116 on client computing device 112. The seeds are stored in database 108 during the registration phase, as discussed with respect to FIG. 2. Then, based on the seed associated with the request, multi-factor authentication auditor program 106 determines which device can generate the given password.

Multi-factor authentication auditor program 106 logs the request and the device information (step 310). In an embodiment, multi-factor authentication auditor program 106 logs the multi-factor authentication request and the associated device information in database 108. For example, multi-factor authentication auditor program 106 logs that the user logged into a bank via a bank application, i.e., protected application 110, on the user's smart phone, e.g., client computing device 112. Continuing the example, multi-factor authentication auditor program 106 also logs that a one-time password input by the user is from the authenticator running on the same phone, i.e., MFA authenticator 116.

Multi-factor authentication auditor program 106 calculates the strength of the multi-factor authentication (step 312). In an embodiment, multi-factor authentication auditor program 106 determines the multi-factor authentication is complete, and multi-factor authentication auditor program 106 calculates one or more strength factors to determine the strength of the multi-factor authentication. For example, a first strength factor may be the number of unique devices used during the multi-factor authentication divided by the number of steps in the multi-factor authentication. In another example, a second strength factor may be the sum of the strength of each authentication method divided by the number of steps in the multi-factor authentication. In yet another example, a third strength factor may be a number of unique locations of the user/device divided by the number of steps in the multi-factor authentication. In another embodiment, multi-factor authentication auditor program 106 uses a rule engine to detect whether the multi-factor authentication occurred on a single device or on multiple devices. In a further embodiment, multi-factor authentication auditor program 106 uses a machine learning model to identify a group of devices that a user typically uses in multi-factor authentication.

Multi-factor authentication auditor program 106 determines whether an anomaly is detected (decision block 314). An anomaly is an indication of a wrong usage or of the multi-factor authentication strength being weak, i.e., less than a pre-defined threshold. For example, an anomaly may be a two-factor authentication performed on the same device. In another example, an anomaly may be a two-factor authentication detected to originate from devices in two locations. In an embodiment, multi-factor authentication auditor program 106 determines an anomaly is present in the multi-factor authentication if one or more strength factors do not meet a pre-defined threshold. For example, if the strength factor is the number of unique devices used during the multi-factor authentication divided by the number of steps in the multi-factor authentication, then a value less than 1 is an anomaly because a value less than one indicates that more than one of the steps in the multi-factor authentication were performed on the same device. In an embodiment, multi-factor authentication auditor program 106 determines an anomaly is present in the multi-factor authentication if a rule engine triggers an event due to detecting that each step of the multi-factor authentication executed on the same device. In another embodiment, multi-factor authentication auditor program 106 determines an anomaly is present in the multi-factor authentication if a machine learning model detects a deviation in a group of devices attributed to the user.

If multi-factor authentication auditor program 106 determines an anomaly is detected ("yes" branch, decision block 314), then multi-factor authentication auditor program 106 determines whether a security policy is applicable (decision block 316). A security policy can be put in place to protect a service provider, such as the provider of protected application 110, from misuse or fraud. For example, a bank security policy may be that if both steps of a two-factor authentication are performed on the same device, then the user cannot transfer or withdraw more than $1000 in the transaction. In another example, a bank security policy may be to disable one or more functions of protected application 110 if the value of the multi-factor strength does not meet a pre-defined threshold. In yet another example, a human resources security policy may be that a user can only log in to the human resources system when the user uses a one-time password generator on a different device.

If multi-factor authentication auditor program 106 determines a security policy is applicable ("yes" branch, decision block 316), then multi-factor authentication auditor program 106 applies the security policy (step 318). In an embodiment, multi-factor authentication auditor program 106 applies one or more security policies to the multi-factor authentication based on the detected anomaly. In an embodiment, a security policy is based on the calculated strength of the multi-factor authentication. In the embodiment, multi-factor authentication auditor program 106 applies different security policies based on one or more threshold strength values.

Responsive to applying the security policy, or if multi-factor authentication auditor program 106 determines a security policy is not applicable ("no" branch, decision block 316), then multi-factor authentication auditor program 106 transmits a notification (step 320). In an embodiment, based on a detected anomaly, multi-factor authentication auditor program 106 transmits a notification to the service provider, i.e., the provider of protected application 110. For example, multi-factor authentication auditor program 106 may send a notification that a user performed a two-factor authentication on one device to alert the service provider of a low-strength authentication. In another example, multi-factor authentication auditor program 106 may notify a service provider that multi-factor authentication auditor program 106 applied a security policy to a user's transaction. In an embodiment, multi-factor authentication auditor program 106 transmits a notification to the user of client computing device 112. For example, if protected application 110 is a banking application, and the user logged in with a two-factor authentication from a single device, then multi-factor authentication auditor program 106 may transmit a notification that a security policy has been applied and the user can withdraw a maximum of $1000.

Multi-factor authentication auditor program 106 logs the multi-factor authentication audit trail (step 322). In an embodiment, multi-factor authentication auditor program 106 logs the authentication information associated with a multi-factor authentication request in database 108. In addition to the request and device information stored in database 108, as discussed with respect to step 310, multi-factor authentication auditor program 106 logs information such as the calculated strength of the multi-factor authentication, whether or not an anomaly was detected, details of a detected anomaly, whether or not an applicable security policy was applied, to whom multi-factor authentication auditor program 106 transmitted a notification, etc. Having an audit trail helps service providers to understand the strength of a multi-factor authentication because it may be difficult to enforce the use of multiple devices for a multi-factor authentication.

Figure 4:
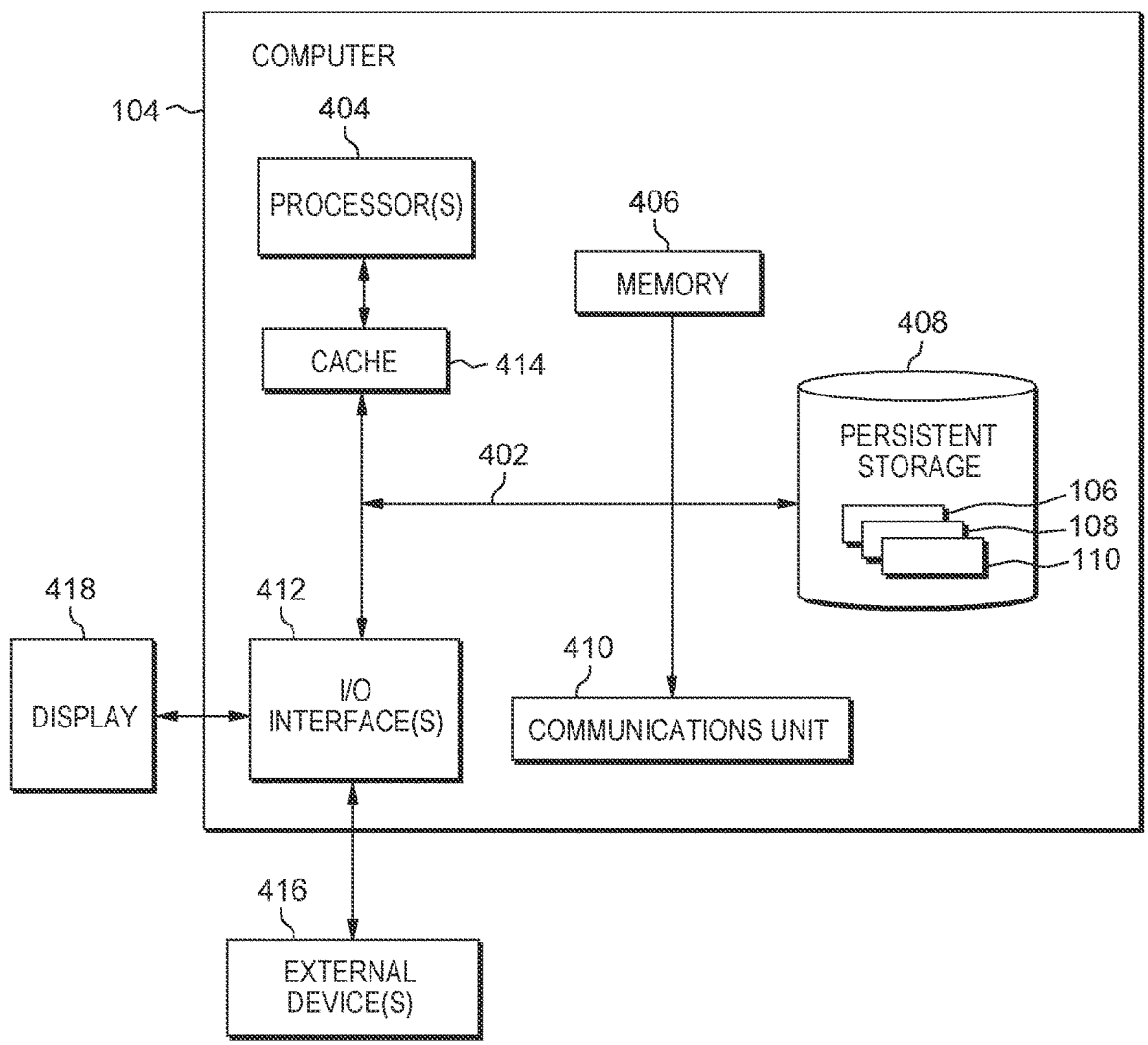
FIG. 4 depicts a block diagram of components of the server computer executing the multi-factor authentication auditor program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., multi-factor authentication auditor program 106, database 108, and protected application 110, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 112. In these examples, communications unit 410 includes one or more network interface cards. Communications unit 410 may provide communications through the use of either or both physical and wireless communications links. Multi-factor authentication auditor program 106, database 108, protected application 110, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., multi-factor authentication auditor program 106, database 108, and protected application 110, on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, a request for a multi-factor authentication for a service from at least one device associated with a user;
   retrieving, by one or more computer processors, information associated with the at least one device;
   logging, by one or more computer processors, the request and the information associated with the at least one device;
   calculating, by one or more computer processors, a strength of the multi-factor authentication based on the request and the information associated with the at least one device, wherein calculating the strength of the multi-factor authentication includes one or more of: dividing a number of unique devices used during the multi-factor authentication by a number of steps in the multi-factor authentication, dividing a sum of a strength of each authentication method by the number of steps in the multi-factor authentication, and dividing a number of unique locations of the at least one device associated with the user by the number of steps in the multi-factor authentication; and
   logging, by one or more computer processors, a multi-factor authentication audit trail.

2. The computer-implemented method of claim 1, further comprising:
   based on the calculated strength of the multi-factor authentication, detecting, by one or more computer processors, an anomaly associated with the multi-factor authentication;
   based on the detected anomaly, determining, by one or more computer processors, at least one security policy is applicable; and
   applying, by one or more computer processors, the security policy to the service.

3. The computer-implemented method of claim 2, wherein detecting the anomaly associated with the multi-factor authentication further comprises:
   determining, by one or more computer processors, the calculated strength of the multi-factor authentication does not meet a pre-defined threshold.

4. The computer-implemented method of claim 2, further comprising:
   transmitting, by one or more computer processors, a notification of the detected anomaly, wherein the notification is transmitted to at least one of a provider of the service and the user.

5. The computer-implemented method of claim 1, wherein the multi-factor authentication audit trail includes at least one of: the request, the information associated with the at least one device, the calculated strength of the multi-factor authentication, a detected anomaly, one or more details of the detected anomaly, an applied security policy; and to whom a notification was transmitted.

6. The computer-implemented method of claim 1, further comprising:
   prior to receiving the request for the multi-factor authentication, receiving, by one or more computer processors, a registration request of the user with a provider of the service;
   determining, by one or more computer processors, the information associated with the at least one device is included in the registration request;
   identifying, by one or more computer processors, the information associated with the at least one device; and
   storing, by one or more computer processors, the registration request in association with the information associated with the at least one device.

7. The computer-implemented method of claim 6, further comprising:
   determining, by one or more computer processors, the information associated with the at least one device is not included in the registration request;
   requesting, by one or more computer processors, the information associated with the at least one device from the service; and
   receiving, by one or more computer processors, the information associated with the at least one device.

8. A computer program product comprising:
   one or more computer readable storage media and program instructions collectively stored on the one or more computer readable storage media, the stored program instructions comprising:
   program instructions to receive a request for a multi-factor authentication for a service from at least one device associated with a user;
   program instructions to retrieve information associated with the at least one device;
   program instructions to log the request and the information associated with the at least one device;
   program instructions to calculate a strength of the multi-factor authentication based on the request and the information associated with the at least one device, wherein the program instructions to calculate the strength of the multi-factor authentication include one or more of: dividing a number of unique devices used during the multi-factor authentication by a number of steps in the multi-factor authentication, dividing a sum of a strength of each authentication method by the number of steps in the multi-factor authentication, and dividing a number of unique locations of the at least one device associated with the user by the number of steps in the multi-factor authentication; and
   program instructions to log a multi-factor authentication audit trail.

9. The computer program product of claim 8, the stored program instructions further comprising:

based on the calculated strength of the multi-factor authentication, program instructions to detect an anomaly associated with the multi-factor authentication;

based on the detected anomaly, program instructions to determine at least one security policy is applicable; and program instructions to apply the security policy to the service.

10. The computer program product of claim 9, wherein the program instructions to detect the anomaly associated with the multi-factor authentication comprise:

program instructions to determine the calculated strength of the multi-factor authentication does not meet a pre-defined threshold.

11. The computer program product of claim 8, the stored program instructions further comprising:

prior to receiving the request for the multi-factor authentication, program instructions to receive a registration request of the user with a provider of the service;

program instructions to determine the information associated with the at least one device is included in the registration request;

program instructions to identify the information associated with the at least one device; and program instructions to store the registration request in association with the information associated with the at least one device.

12. The computer program product of claim 11, the stored program instructions further comprising:

program instructions to determine the information associated with the at least one device is not included in the registration request;

program instructions to request the information associated with the at least one device from the service; and program instructions to receive the information associated with the at least one device.

13. A computer system comprising:

one or more computer processors;

one or more computer readable storage media;

program instructions collectively stored on the one or more computer readable storage media for execution by at least one of the one or more computer processors, the stored program instructions comprising:

program instructions to receive a request for a multi-factor authentication for a service from at least one device associated with a user;

program instructions to retrieve information associated with the at least one device;

program instructions to log the request and the information associated with the at least one device;

program instructions to calculate a strength of the multi-factor authentication based on the request and the information associated with the at least one device, wherein the program instructions to calculate the strength of the multi-factor authentication include one or more of: dividing a number of unique devices used during the multi-factor authentication by a number of steps in the multi-factor authentication, dividing a sum of a strength of each authentication method by the number of steps in the multi-factor authentication, and dividing a number of unique locations of the at least one device associated with the user by the number of steps in the multi-factor authentication; and program instructions to log a multi-factor authentication audit trail.

14. The computer system of claim 13, the stored program instructions further comprising:

based on the calculated strength of the multi-factor authentication, program instructions to detect an anomaly associated with the multi-factor authentication;

based on the detected anomaly, program instructions to determine at least one security policy is applicable; and program instructions to apply the security policy to the service.

15. The computer system of claim 14, wherein the program instructions to detect the anomaly associated with the multi-factor authentication comprise:

program instructions to determine the calculated strength of the multi-factor authentication does not meet a pre-defined threshold.

16. The computer system of claim 13, the stored program instructions further comprising:

prior to receiving the request for the multi-factor authentication, program instructions to receive a registration request of the user with a provider of the service;

program instructions to determine the information associated with the at least one device is included in the registration request;

program instructions to identify the information associated with the at least one device; and program instructions to store the registration request in association with the information associated with the at least one device.

17. The computer system of claim 16, the stored program instructions further comprising:

program instructions to determine the information associated with the at least one device is not included in the registration request;

program instructions to request the information associated with the at least one device from the service; and program instructions to receive the information associated with the at least one device.

\* \* \* \* \*